United States Patent [19]

Ueyama et al.

[11] 4,211,477

[45] Jul. 8, 1980

[54] LIGHT EXPOSING PRISM SYSTEM FOR USE IN FORMING PHOSPHOR PLANE OF COLOR PICTURE TUBE

[75] Inventors: Takehiko Ueyama; Masahiro Nishizawa, both of Mobara; Yoshiyuki Odaka, Isumimachi; Hiromi Matsuda, Mobara, all of Japan

[73] Assignee: Hitachi, Ltd., Japan

[21] Appl. No.: 931,542

[22] Filed: Aug. 7, 1978

[30] Foreign Application Priority Data

May 26, 1978 [JP] Japan ................................ 53-62335

[51] Int. Cl.$^{2}$ ........................................ G03B 41/00

[52] U.S. Cl. ........................................ 354/1

[58] Field of Search ........................................ 354/1

[56] References Cited

U.S. PATENT DOCUMENTS

| | | | |
|---|---|---|---|
| 3,888,673 | 6/1975 | Suzuki et al. | 354/1 |
| 4,052,122 | 10/1977 | Yamazaki et al. | 354/1 |
| 4,110,760 | 8/1978 | van Nes | 354/1 |

*Primary Examiner*—Monroe H. Hayes

*Attorney, Agent, or Firm*—Craig & Antonelli

[57] ABSTRACT

A light exposing prism system for use in light exposure process for forming a phosphor plane of a color picture tube is disclosed. The prism system is arranged between a panel of the color picture tube and a linear exposing light source and includes a plurality of small prisms which are arranged transversely to an axial line extending through a center of the panel and a center of the light source and to a longitudinal axis of the light source. The prism system is adapted to be oscillated in the direction of arrangement of the small prisms. Pitch of the arrangement of the small prisms is within a range of 0.05 mm to 3.0 mm, preferably 1.0 mm to 3.0 mm.

4 Claims, 5 Drawing Figures

LIGHT EXPOSING PRISM SYSTEM FOR USE IN FORMING PHOSPHOR PLANE OF COLOR PICTURE TUBE

The present invention relates to a prism system for exposing light to a panel of a color picture tube during a light exposure process for forming a phosphor plane of a stripe type color picture tube, which prism system is inserted between the panel of the color picture tube and an exposing light source to create a plurality of apparent exposing light sources.

A phosphor plane of a black matrix type color picture tube is generally manufactured by applying a photoresist film over an entire inner surface of the panel of the tube and exposing light to the panel through slots of a shadow mask. The light exposure process is conducted three times one for each of the three primary colors, i.e. green, blue and red. After the light exposure, those portions of the photoresist film which have not been exposed to light are removed in a developing process. Then, graphite coating is applied over the entire inner surface of the panel, which is then subjected to an etching process, in which the remaining photoresist film is removed together with the graphite coating applied thereon. Then, mixture of phosphor for green and photoresist is applied over the entire inner surface of the panel, which is then exposed to light through the slots of the shadow mask and subjected to a developing process, leaving phosphor stripes for green each having a predetermined width relative to the slot width of the shadow mask. The above step is repeated for formation of phosphor stripes for blue and red to complete the phosphor plane. In the manufacture of the phosphor plane of the color picture tube other than the black matrix type color picture tube, mixture of photoresist and phosphor is applied on the entire inner surface of the panel of the tube, and the panel is exposed to light through the slots of the shadow mask. After the light exposure, it is developed to remove those portions of the mixture film which have not been exposed to the light. In the manner, phosphor stripes each having a predetermined width relative to the slot width of the shadow mask are formed.

The width of the phosphor stripe is an important factor in improving a color purity of a reproduced picture image. Accordingly, in the light exposure process for the panel of the tube, it is necessary to expose the panel to the light properly relative to the slot width of the shadow mask. When the width of the phosphor stripe is to be narrowed or broadened relative to the slot width of the shadow mask, it is an effective way to employ two exposing light sources for exposing lights from two different points. This method is disclosed in, for example, the U.S. Pat. No. 4,070,498. However, when two linear light sources are used, a spacing between the light sources is limited and hence it is difficult to establish an optimum spacing. In addition, power consumption is doubled.

An alternative approach is disclosed in, for example, copending U.S. patent application Ser. No. 846,536 filed on Oct. 28, 1977 and assigned to the assignee of the present invention, and copending British patent application No. 45,477/77, German patent application P 2749978.1 and Finnish patent application No. 773,379, all filed by the applicant of the present application, in which a single linear light source is used and a prism system including a number of small prisms is inserted between the linear light source and the panel of the tube so that there appear two (or four) apparent light sources when viewed from any point on the panel. In this prism system, the plurality of small prisms are arranged side by side in the direction transversely to an axial line extending through a center of the light source and a center of the panel and to a longitudinal axis of the light source. In the copending applications recited above, a tapering angle of a sloped surface of the prism is specified and a pitch of the arrangement of the plurality of small prisms is specified to be not larger than one fifth of the width of the linear light source. The width of the linear light source ordinarily used is 0.5 mm to 1.5 mm, and approximately 2.5 mm at maximum. Therefore, the pitch of the arrangement of the prisms is not larger than 0.5 mm even if the width of the linear light source is selected to the maximum. The widths of the two linear light sources used in the light exposure process are determined by a particular specification of the color picture tube, and when a narrower width of the light source is required, a narrower pitch of the arrangement of the prisms must be established. This imposes a very difficult condition on the manufacture of the prism system and hence it is disadvantageous to the manufacture of the prism system. If it is allowed to arrange the small prisms at a larger pitch, the difficulty in the manufacture of the prism system would be resolved except when the arrangement of small pitch is unavoidably necessary. The restriction to the pitch of the prism arrangement disclosed in the copending applications recited above is needed in order to make uniform the widths and the brightness distribution of the two linear light sources which appear when the light source is viewed from the panel through the prism apparatus. The particular value of the restriction is determined for the case where the prism apparatus is stationary.

It is an object of the present invention to provide a prism system for exposing light to a panel in a light exposure process for forming a phosphor plane, which apparatus assures the formation of a high quality of phosphor plane and facilitates the manufacture thereof.

According to the present invention, there is provided a light exposing prism system for use in a light exposing process for forming a phosphor plane of a color picture tube, which prism system is arranged between a panel of the color picture tube and a linear exposing light source and includes a plurality of small prisms arranged in the direction transverse to an axial line extending through a center of the panel and a center of the light source and to a longitudinal axis of the light source, with the small prisms being arranged at a pitch of between 0.05 mm and 3.0 mm.

The present invention is now explained in detail with reference to the accompanying drawings, in which.

Figure 1:
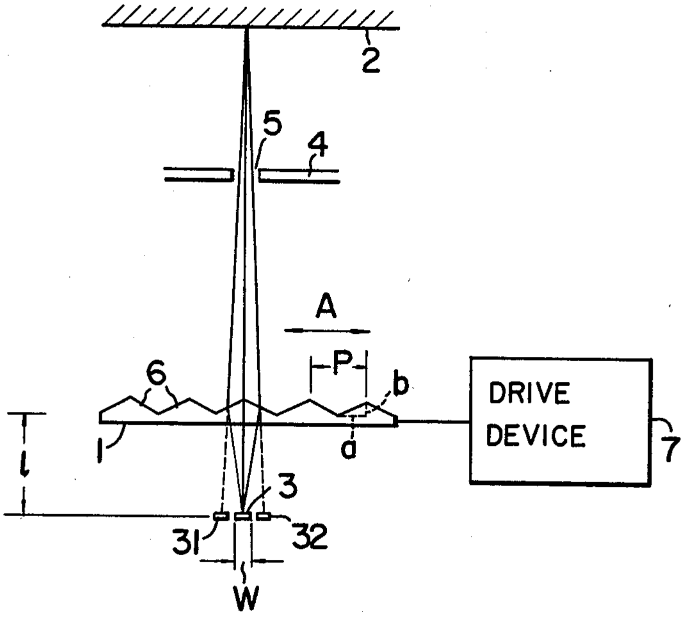
FIG. 1 is a schematic diagram of a light exposing system in a light exposure process for forming a phosphor plane of a color picture tube.

Referring to FIG. 1, there is shown a schematic diagram of a light exposing system in a light exposure process in the course of the manufacture of a color picture tube. A prism system 1 in accordance with the present invention is arranged between a panel 2 and a linear light source 3 such that there appear two linear light sources 31 and 32 when the light source 3 is viewed from any point on the panel 2. Thus, the panel 2 is exposed by the apparent light sources 31 and 32 through a slot 5 of a shadow mask 4. The light source 3 has a width W and a longitudinal axis which is normal to a plane of the drawing. The prism system 1 has a plane which is parallel to the longitudinal axis of the light source 3 and includes in that plane a plurality of small prisms 6 which are arranged transversely to an axial line extending through a center of the panel 2 and a center of the light source 3 and to the longitudinal axis of the light source 3. A drive device 7 functions to oscillate the prism system 1 in the direction of the arrangement of the prisms 6, i.e. in the direction of an arrow A.

Figure 2:
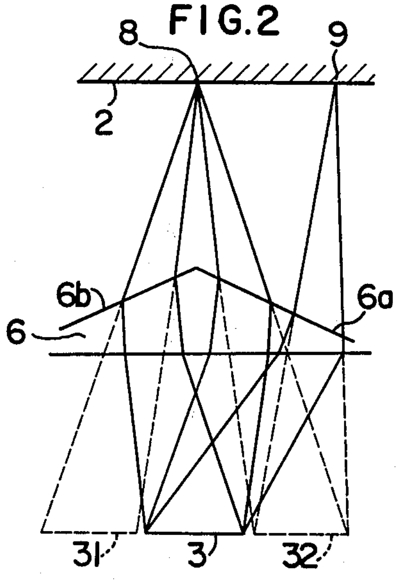
FIG. 2 illustrates the light exposure to the panel through the prism apparatus.

The panel 2 is exposed to the light in a manner shown in FIG. 2, in which the shadow mask 4 is omitted. When the light source 3 is viewed from a point 8 on the panel 2, two virtual light sources 31 and 32 appears, but when the light source 3 is viewed from a point 9, only the virtual light source 32 appears because only the light from a side *6a* of the small prism 6 reaches the point 9. It is thus seen that there is a region in which the virtual light source 31 fully appears, a region in which the virtual light source appears only partially and a region in which the virtual light source 31 does not appear at all, between the points 8 and 9. In other words, it is not possible to expose the entire surface of the panel 2 with two light sources of equal light source width and equal brightness distribution. Such ununiform exposure can be overcome by arranging the plurality of small prisms 6 as shown in FIG. 1 with the size of each prism 6 or the pitch P of the arrangement being selected to be sufficiently smaller than the width W of the linear light source. In the copending applications recited above, it is stated that the pitch P is equal to one fifth of the width W of the linear light source.

Figure 3:
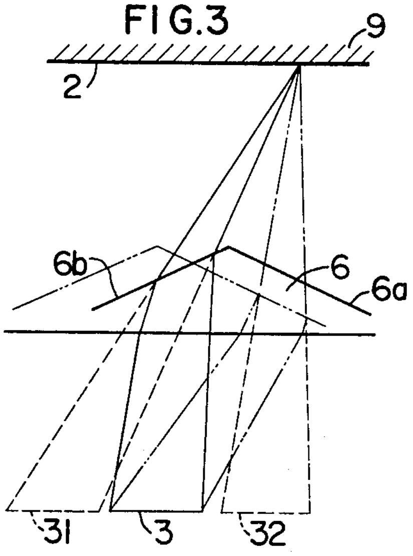
FIG. 3 illustrates the light exposure to the panel when the prism system has been displaced.

It has been experimentarily proved that when the prism system 1 is oscillated in the direction of the arrow A, however, two effectively equivalent linear light sources 31 and 32 can be viewed at any point on the panel 2 even if the pitch P is larger than one fifth of the width W of the light source so that uniform brightness distribution of the light source is attained at any point on the panel 2. It has been proved that when the prism system 1 is oscillated, a desired exposure to the phosphor plane is attained even when the pitch P is selected to be larger than one fifth of the width W of the light source 3. The effect of the oscillation of the prism system 1 will also be apparent from FIG. 3, in which the prisms 6 have been moved to the right from the position shown in FIG. 2. As seen from FIG. 3, after the prisms 6 have been moved, the point 9 which has been exposed only by the virtual light source 32 in FIG. 2 is now exposed also by the virtual light source 31 as well because the light passing through a side *6b* of the prism 6 reaches the point 9. Accordingly, the point 9 is effectively exposed with two linear light sources 31 and 32. The amplitude of the oscillation is selected to be larger than the pitch P. Practically, it is five times as large as the pitch P. As will be discussed in a specific embodiment described later, when the plane of the prism system 1 is divided into a plurality of blocks, the amplitude of the oscillation is selected to be larger than the length of one edge of the block in the direction of the oscillation in order to avoid the affect by the boundaries of the blocks. When the pitch P of the arrangement of the prisms 6 is large, however, the change of the intensity of illumination of the panel due to the oscillation of the prisms increases considerably. The experiment showed that when the pitch P of the prisms 6 was not larger than 3.0 mm, the change of the intensity of illumination was not larger than 20%, which was practically acceptable.

A minimum value $P_{min}$ of the pitch P of the arrangement of the prisms 6 is now discussed. It has been experimentally proved that when the pitch P is small, a refraction grating effect due to the small prisms 6 appears so remarkably that a uniform distribution of the intensity of illumination on the panel is not attained and hence it is difficult to attain a uniform exposure. Accordingly, the minimum pitch $P_{min}$ must be within a range in which nonuniformity of the distribution of the intensity of illumination is permissible. It has also been experimentally proved that whether the refraction grating effect appears or not at a given pitch depends on a taper ($t=b/a$, see FIG. 1) of a sloped plane of the prism, that is, the larger the taper t is, the less the chance of the appearance of the refraction grating effect even when the pitch P is small. That is, the larger the taper t is, the smaller the minimum pitch $P_{min}$ may be.

On the other hand, the taper t is determined in inverse proportion to a distance l between the light source 3 and the prism system 1 in order to maintain a center-to-center distance of the virtual light sources 31 and 32 constant. Namely, there exists a relation of $l \cdot t = \text{constant}$.

In general, practical value of the distance l is within a range of 40 to 100 mm, and the center-to-center distance of the virtual light sources 31 and 32 is practically not larger than 3 mm. Within those ranges, the taper t is within the range of 0.001 to 0.030. The experiment showed that the minimum pitch $P_{min}$ within the above range for the taper t was $P_{min}=1.5$ mm for $t=0.001$, $P_{min}=0.4$ mm for $t=0.010$, $P_{min}=0.2$ mm for $t=0.020$ and $P_{min}=0.05$ mm for $t=0.030$. Thus, the minimum pitch which can be adopted as the pitch P for the arrangement of the prisms 6 is equal to 0.05 mm. The refraction grating effect was measured at this minimum pitch and it was proved that the ununiformity of the distribution of the intensity of illumination on the panel due to the refraction grating effect was practically acceptable. Accordingly, so long as the taper is selected at a value within the range of 0.001 to 0.030, the pitch P of the arrangement may be selected to be larger than 0.05 mm. Taking the upper limit for the pitch P described above into consideration, the pitch P may be selected to a value within the range of 0.05 mm to 3.0 mm. Accordingly, the freedom in the manufacture of the prism system 1 increases and the manufacture is facilitated.

It is desirable, however, to eliminate the ununiformity of the intensity of illumination in order to allow more precise control of the width of the phosphor stripe relative to the slot width of the shadow mask. To this end, it is necessary to increase the pitch P of the arrangement of the prisms 6. In the experiment, the refraction grating effect was not detectable when the pitch P was not smaller than 1.0 mm. Accordingly, a desired phosphor pattern can be produced most properly when the panel 2 is exposed with the prism system 1 having the pitch of the arrangement of the prisms 6 equal to 1.0 mm to 3.0 mm. The manufacture of such a prism system is easier because the pitch of the prism arrangement is large.

Figure 4:
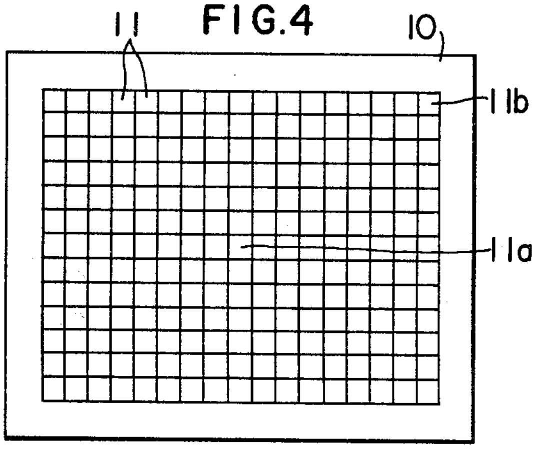
FIG. 4 is a plan view of the prism system.
Figure 5:
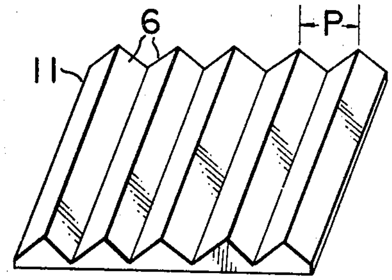
FIG. 5 is a perspective view of an arrangement of small prisms in each of a plurality of blocks defining a plane of the prism system.

Referring now to FIGS. 4 and 5, a specific embodiment of the present invention is explained. As shown in FIG. 4, the prism system 1 is made of an acryl plate 10 of 200 mm×160 mm size, in which 17×13 blocks 11 each of 10 mm square are formed. In each block 11, five small prisms 6 having a pitch P of 2.0 mm and a constant taper are arranged side by side, as shown in FIG. 5. The taper of the prisms in a center block 11*a* is equal to 0.001, the taper of the prisms in the outermost corner block 11*b* is equal to 0.004, and the tapers of the prisms in the other blocks are selected appropriately such that a difference between the taper of the prisms in one block and the taper of the prisms in an adjacent block is minimum. The taper of the prisms in the center block of the prism system 1 is selected to be different from the taper of the prisms in the peripheral blocks because the center-to-center distance of the two linear light sources necessary to expose the center area of the panel is different from the center-to-center distance of the two linear light sources necessary to expose the peripheral area. The necessary center-to-center distance of the linear light sources is determined by the distance between the light source 3 and the panel 2 and the distance between the light source 3 and the prism system 1, depending on a particular specification of the color picture tube. The plane of the prism system 1 is divided into a plurality of blocks 11 and the taper of the prisms in each block is selected to be equal in order to facilitate the manufacture of the prism system 1.

The prism system thus constructed was positioned 70 mm above a linear light source having a width of 0.9 mm and approximately 150 mm below the panel, to expose light to a panel of a 22 inch 110° deflection color picture tube. The result was that the center-to-center distance of the light sources as viewed from the center of the panel was equal to 1.0 mm, and the center-to-center distance of the light sources as viewed from the outermost periphery of the panel was equal to 2.0 mm. Using this system, the phosphor stripes having the required widths at the respective areas of the panel, relative to the slot width of the shadow mask were formed. Although the panel is exposed to the light three times one for each of the three primary colors, i.e. green, blue and red, the widths of the phosphor stripes for green, blue and red can be uniform because the widths of the phosphor stripes can be tailored as desired. Accordingly, a high performance phosphor plane can be manufactured.

Usually, the blocks 11 are prepared as units and the prism system 1 is constructed by combining the blocks depending on a particular specification of the color picture tube to be manufactured, to attain the required distribution of tapers of the prisms. In this manner, the manufacture of the prism system 1 is facilitated and the design change of the prism system 1 is also facilitated because it only requires the replacement of certain blocks 11. Accordingly, the freedom of manufacture of the phosphor plane increases.

What is claimed is:

1. A light exposing prism system for use in a light exposure process for forming a phosphor plane of a color picture tube, said prism system being arranged between a panel of said color picture tube and a linear exposing light source and including a plurality of small prisms arranged in a plane substantially perpendicular to an axial line extending through a center of said panel and a center of said light source, each of said small prisms having a longitudinal axis substantially parallel with an axis of said linear light source and two sloped surfaces elongated in parallel with said longitudinal axis and inclined in a direction perpendicular to said longitudinal axis and parallel with said perpendicular plane, said sloped surfaces having the same inclination with opposite directions with respect to said perpendicular plane, said small prisms being arranged at a pitch of between 0.05 mm and 3.0 mm in said direction perpendicular to said longitudinal axis.

2. A light exposing prism system according to claim 1, wherein said prism system is adapted to be oscillated in the direction of the arrangement of said small prisms.

3. A light exposing prism system according to claim 2, wherein said small prisms are arranged at a pitch of between 1.0 mm and 3.0 mm.

4. A light exposing prism system according to claim 1, wherein said small prisms are arranged in a plurality of groups each including a predetermined number of said small prisms, the sloped surfaces of said small prisms included in each of said groups having the same inclination with respect to said perpendicular plane, the inclination of the sloped surfaces in the group nearer to said axial line is smaller than the inclination of the sloped surfaces in the group farther from said axial line.

* * * * *